US006670908B2

(12) United States Patent
Wilson et al.

(10) Patent No.: US 6,670,908 B2
(45) Date of Patent: Dec. 30, 2003

(54) AUTOMATED SYSTEM AND METHOD FOR PROCESSING METEOROLOGICAL DATA

(75) Inventors: Gregory S. Wilson, Huntsville, AL (US); Michael P. Dickerson, Huntsville, AL (US)

(73) Assignee: Baron Services, Inc., Huntsville, AL (US)

(*) Notice: Subject to any disclaimer, the term of this patent is extended or adjusted under 35 U.S.C. 154(b) by 0 days.

(21) Appl. No.: 09/919,588

(22) Filed: Jul. 31, 2001

(65) Prior Publication Data

US 2003/0025627 A1 Feb. 6, 2003

(51) Int. Cl.[7] ............................. G01S 13/00; G01S 3/02; G09G 5/00
(52) U.S. Cl. ..................... 342/26; 342/176; 342/460; 345/629; 705/3
(58) Field of Search ................... 342/26, 460, 176; 701/14; 702/3, 5; 345/327, 328, 629

(56) References Cited

U.S. PATENT DOCUMENTS

| | | | |
|---|---|---|---|
| 4,873,481 A | | 10/1989 | Nelson et al. |
| 5,053,778 A | * | 10/1991 | Imhoff |
| 5,135,397 A | | 8/1992 | Yen |
| 5,239,623 A | | 8/1993 | Sato et al. |
| 5,255,190 A | | 10/1993 | Sznaider |
| 5,262,773 A | | 11/1993 | Gordon |
| 5,262,782 A | | 11/1993 | Rubin et al. |
| 5,281,815 A | | 1/1994 | Even-Tov |
| 5,317,689 A | | 5/1994 | Nack et al. |
| 5,339,085 A | | 8/1994 | Katoh et al. |
| 5,351,045 A | | 9/1994 | Cornman |
| 5,363,475 A | | 11/1994 | Baker et al. |
| 5,379,215 A | | 1/1995 | Kruhoeffer et al. |
| 5,523,759 A | | 6/1996 | Gillberg et al. |
| 5,583,972 A | | 12/1996 | Miller |
| 5,598,359 A | | 1/1997 | Montag et al. |
| 5,630,718 A | | 5/1997 | Montag et al. |
| 5,648,782 A | | 7/1997 | Albo et al. |
| 5,717,589 A | | 2/1998 | Thompson et al. |
| 5,945,926 A | * | 8/1999 | Ammar et al. ................. 342/26 |
| 6,100,897 A | | 8/2000 | Mayer et al. |
| 6,112,075 A | | 8/2000 | Weiser |
| 6,266,063 B1 | | 7/2001 | Baron et al. |
| 6,339,747 B1 | * | 1/2002 | Daly et al. ..................... 702/3 |
| 6,340,946 B1 | * | 1/2002 | Wolfson et al. ............... 342/26 |

OTHER PUBLICATIONS

Blackmer, R.H., Jr.; Duda, R.O., "Application of Pattern Recognition Techniques to Digitized Radar Data," 1972, pp. 138–143, Stanford Research Institute, Menlo Park, California.

Bjerkaas, Carlton L.; Forsyth, Douglas E. "An Automated Real–Time Storm Analysis and Storm Tracking Program (WEATRK)," *AFGL–TR–80–0316,* Oct. 1, 1980, pp. 1–115, Air Force Geophysics Laboratory, Hanscom AFB, Massachusetts.

Zittel, W. David, "An Aviation Composite Hazards Product," 2nd International Conference on The Aviation Weather System, Jun. 19–21, 1985, pp. 109–116, American Meteorological Society, Montreal, Canada.

(List continued on next page.)

*Primary Examiner*—Stephen C. Buczinski
(74) *Attorney, Agent, or Firm*—Lanier Ford Shaver & Payne P.C.

(57) ABSTRACT

A computer based method of processing meteorological data to automatically characterize significant meteorological events is disclosed. Meteorological data is received and processed to generate a plurality of distinct threat products for a given geographic area. The threat products are combined over the given geographic area to create a composite threat product, which is automatically compared to predetermined threshold values to identify one or more areas of threat. A system for processing meteorological data to automatically characterize significant meteorological events is also disclosed.

14 Claims, 8 Drawing Sheets

OTHER PUBLICATIONS

Forsyth, Douglas E.; Istok, Michael J.; O'Bannon, Timothy D.; Glover, Kenneth M., "Boston Area NEXRAD Demonstration (BAND)," *AFG:–TR–85–0098,* May 8, 1995, pp. 1–59, Air Force Geophysics Laboratory, Hanscom AFB, Massachusetts.

Zittel, W. David, "Computer Application and Techniques for Storm Tracking and Warning," *17th Conference on Radar Meteorology,* Seattle WA. pp. 514–521, Oct. 26–29, 1976, American Meteorological Society, Boston, Massachusetts.

Ostlund, Stellan Sven, "Computer Software for Rainfall Analyses and Echo Tracking of Digitized Radar Data," *NOAA Technical Memorandum ERL WMPO–15,* May 24, 1974, pp. 1–82, National Oceanic and Atmospheric Administration, Boulder, Colorado.

Wiggert, Victor; Ostlund, Stellan S.; Lockett, Gloria J.; Stewart, John V., "Computer software for the Assessment of Growth Histories of Weather Radar Echoes," 1976, pp. 1–86, National Hurricane and Experimental Meteorology Laboratory, Coral Gables, Florida.

Zittel, W. David, "Evaluation of a Remote Weather Radar Display—vol. 11—Computer Application for Storm Tracking and Warning," *FAA–RD–75–60, II,* Dec., 1976, pp. 1–112, National Oceanic and Atmospheric Administration, Springfield, Virginia.

Wieler, James G.; Harris, F. Ian; Snapp, Michael R., "An Evaluation of an Automatic Cell Detection and Tracking Algorithm," *AFGL–TR–82–0368,* Nov. 3, 1982, pp. 1–50, National Oceanic and Atmospheric Administration, Air Force Geophysics Laboratory, Hanscom AFB, Massachusetts.

Blackmer, Roy H., Jr., "The Lifetime of Small Precipitation Echos," 1953, pp. 103–108, Massachusetts Institute of Technology.

The NEXRAD Joint System Program Office, "NEXRAD Technical Requirements [WSR–88D]," *R400–SP401A,* Nov. 1, 1991, pp. 3–1–M–2, NEXRAD Joint System Program Office, Silver Spring, Maryland.

The NEXRAD Joint System Program Office, "Next Generation Weather Radar Product Description Document," *R400–PD–202,* Dec., 1986, NEXRAD Joint System Program Office, Silver Spring, Maryland.

Wilk, Kenneth E.; Gray, Kathryn C., "Processing and Analysis Techniques Used with the NSSL Weather Radar System," 1970, pp. 369–374, National Severe Storms Laboratory, Norman, Oklahoma.

Forstyh, Douglas Edward, "Real Time Forecasting of ECO-H–Centroid Motion—A Thesis Submitted to the Graduate Faculty, The University of Oklahoma Graduate College," 1979, University of Oklahoma.

The NEXRAD Joint System Program Office, "Next Generation Weather Radar: Results of Spring 1983 Demonstration of Prototype NEXRAD Products in an Operational Environment," Sep., 1984, NEXRAD Joint System Program Office, Silver Spring, Maryland.

Barclay, Peter A.; Wilk, Kenneth E., "Severe Thunderstorm Radar Echo Motion and Related Weather Events Hazardous to Aviation Operations," *ESSA Technical Memorandum ERLTM–NSSL 46,* Jun., 1970, National Severe Storms Laboratory, Norman, Oklahoma.

Eilts, Michael D.; Johnson, J.T.; Mitchell, E. Dewayne; Sanger, Sarah; Stumpf, Greg; Witt, Arthur; Thomas, Kevin W.; Hondl, Kurt D.; Rhue, Douglas; Jain, Michael. "Severe Weather Warning Decision Support System," *Bulletin of the American Meteorological Society,* Feb., 1996, pp. 536–540, American Meteorological Society.

Stumpf, Gregory J.; Foster, Michael P., "1995 NSSL Warning Decision Support System Test," *Bulletin of the American Meteorological Society,* Feb., 1996, pp. 570–574, American Meteorological Society.

Dixon, Michael; Wiener, Gerry., "Titan: Thunderstorm Identification, Tracking, Analysis and Nowcasting—A Radar–based Methodology," *Journal of Atmospheric and Oceanic Technology,* Dec. 1993, pp. 785–797, vol. 10, No. 6, American Meteorological Society.

Forsyth, Douglas, E.; Burgess, Donald W.; Doswell, Charles A. III; Jain, Michael H.; Mooney, Larry E.; Rabin, Robert M.; Rust, W. David, "NOAA Technical Memorandum ERL NSSL–101: Doplight '87 Project Summary," Jun., 1990, pp. 1–183, NOAA, Norman, OK.

Rinehart, R.E., "Radar for Meteorologists." http://people-.aero.und.edu/~rinehart/toc.html, 1991.

Crum, Timothy D.; Alberty, Ron L., "The WSR–88D and the WSR–88D Operational Support Facility," *Bulletin of the American Meteorological Society,* Sep. 1993, pp. 1669–1687, vol. 74, No. 9, American Meteorological Society, Norman, OK.

Operations Training Branch, "Build 9.0 Precursor Training," (USA), Jul. 15, 1996, National Oceanic and Atmospheric Administration.

Unisys WeatherMAX Resource Page, http://weather.unisys.com/wxmax/index.html.

* cited by examiner

AUTOMATED SYSTEM AND METHOD FOR PROCESSING METEOROLOGICAL DATA

BACKGROUND OF INVENTION

1. Field of Invention

The present invention relates generally to the field of weather event identification, and weather event forecasting and tracking, and more particularly, to a system and method for processing meteorological related data to automatically characterize significant weather events.

While the present invention is subject to a wide range of weather forecasting, reporting, and alerting applications, it is particularly well suited to automatically identify and track the present and anticipated path of travel of significant weather events.

2. Technical Background

In today's weather reporting and forecasting fields, an ever increasing importance is being placed on the timeliness and accuracy of the information being broadcast or otherwise reported. A large percentage of the population of the United States relies upon weather forecast reports broadcast or otherwise distributed by both local and national television stations, radio stations, Emergency Management Agencies (EMAs), and other dissemination sources to accurately relay current weather conditions, and to make predictions relating to future weather conditions for a given geographic area. This information is generally used by individuals to make decisions such as what to wear, whether they should participate in certain activities or not, when they should embark on a trip, and more importantly, when they should seek shelter. When severe weather threatens a particular geographic area, a majority of the population made aware of the severe weather for that particular geographic area has an immediate desire to find out as much information as possible about the severe weather conditions. Weather events such as tornadoes, severe thunderstorms, hail, lightning, heavy rain, and high winds present a significant risk of damage to property, injury to persons, and in some cases death. For these reasons, it benefits individuals to determine if they are likely to be affected by such severe weather. If they are, they can seek shelter, or otherwise take cover to protect themselves from these events. It is therefore critical that the disseminated weather information be both timely and accurate.

During the last two decades, significant strides have been made in this regard. The National Weather Service (NWS) now maintains a network of weather radar installations known as Nexrad located at approximately one-hundred and thirty-eight sites throughout the United States. Observers within a 150 mile radius of these installations monitor the weather conditions for their respective geographic areas of radar coverage, and provide periodic reports such as teletyped messages and more recently, information known generally in the art as the Combined Attribute Table produced at each radar, to anyone accessing the data stream. Generally speaking, this information is distributed to subscribers through third party weather service providers or directly from the federal government. Other weather service providers, such as Global Atmospherics in Arizona, provide information such as lightning strike data on a subscription basis. In addition, many local television stations now own or lease their own Doppler weather radar systems. This technology gives these stations the ability to broadcast substantially real-time weather information for the benefit of the portion of the public in the viewing areas of these stations.

The weather information provided by any one or combination of mechanisms discussed above may be synthesized at a local television station or a third party provider into a understandable format for graphical display, or other form of dissemination to the public. Typically, the meteorological data is collected from one or more sources at the local television station and combined with geographic image maps of a particular geographic region to generate a graphic display of the weather conditions for that particular geographic region. The composite weather images can be stored over time, sequenced, and looped with the aid of a computer system so that the television stations and other broadcast mediums can deliver weather animation that simulates the movement of the weather system across the geographic region over some period of time. Technology has also advanced such that television stations and Internet providers can now operate computer systems that actually predict storm movement and other weather system movement, and forecast that movement for some time into the future. Such systems are generally known in the art as storm tracking systems.

During the 1990's, local television station weathercasters became a more critical element in the dissemination and response process for severe weather situations. In certain instances, media weathercasters have assisted the national weather service in detecting severe weather conditions. This was made possible, in part, by advances in communication technologies, computer processing, display technologies, and radar technology allowing for the development of substantially real-time commercial weather products for use by television stations. These advancements have also made it possible to combine information obtained from multiple radars into single-situational display products. The result has been enhanced situational awareness for the broadcasters and their viewing public, which in turn, has led to fewer instances of loss of life and property as a result of severe weather.

Early storm tracking systems such as the FASTRAC® system marketed by Baron Services, Inc., Huntsville, Ala., are able to manually identify a storm and provide the broadcast meteorologist with the capability of manually creating a storm track while on the air. That system was later upgraded to provide for quasi-automated storm tracking. By using historical data saved in the computer system's memory, a meteorologist may use both the most recently received weather data and historical weather data to create a storm track. Another advancement is the use of Nexrad attribute data to project the movement of a storm with a single user-operation. Using Nexrad attributes provided by the NWS Combined Attribute Table (CAT), a weathercaster can collect Nexrad attribute information corresponding to a storm, derive a storm position from the Nexrad attribute information, and calculate a projected storm path using the derived storm position and the Nexrad attribute information.

Such storm tracking systems, however, are not without their limitations. First, none of the above-mentioned storm tracking systems are truly automated as defined in accordance with the present invention. Secondly, systems that rely upon the NWS manual subjective analysis of radar data rely upon NWS forecasters for their subjective analysis of radar data to provide information pertaining to severe storm location and projected storm movement direction and speed of travel. Thus, when the weather forecaster is wrong, as is often the case, the storm tracking systems may be performing a storm track on the wrong portion of the weather event. In addition, present systems require television broadcasters to manipulate the systems while on the air. As can be appreciated, such systems are labor intensive and do not provide the user with a simple intuitive method for predicting and projecting the location and projected speed and direction of travel of the storms. For timely alerting to the public, especially when numerous storms are present.

What is needed therefore is a system and method of processing meteorological data to automatically characterize significant weather events that is simple to use and requires no human intervention. More specifically, there is a need for a computer based system and method for processing radar return data to create a composite threat image wherein the computer automatically compares the composite threat image to a predetermined threshold value or values to identify one or more areas of threat. The system and method should automatically prioritize the threats based upon type, intensity, size, and/or other criteria without human intervention, and be capable of sequentially displaying the prioritized threats, thus eliminating the need for on-air manipulation of storm tracking systems by weathercasters during a television broadcast. Such a system and method should be capable of substantially real-time storm tracking, reliable in operation, accurate, easy to maintain, and inexpensive in operation. It is to the provision of such a system and method that the present invention is primarily directed.

SUMMARY OF INVENTION

One aspect of the present invention relates to a computer based method of processing meteorological data to automatically characterize significant weather events. The method includes the steps of creating a composite threat image from meteorological data received from a weather data source, and comparing the composite threat image to predetermined threshold values to identify one or more areas of threat.

An additional aspect of the present invention is directed to a computer based method of processing meteorological data to automatically characterize significant meteorological events. The method includes the steps of receiving weather data, and processing the weather data to generate a plurality of threat images, each distinct from one another for a given geographic area. The plurality of threat images are combined over the given geographic area to create a composite threat image, and the composite image is compared to predetermined threshold values to identify one or more areas of threat.

In another aspect, the present invention is directed to a system for processing meteorological data to automatically characterize significant weather events. The system includes memory for storing the meteorological data, and a processor communicating with the memory to create a composite threat image from the received meteorological data. The processor is configured to automatically compare the created composite threat image to predetermined threshold values to identify one or more areas of threat.

In yet another aspect of the present invention relates to a method of processing meteorological data to automatically characterize significant weather events. The method includes the steps of receiving meteorological data indicative of a meteorological event affecting a geographic region. The meteorological data is processed to generate a plurality of distinct threat products affecting that geographic region. The plurality of threat products affecting the geographic region are combined to create a composite threat product and the composite threat product is thereafter compared to threshold values to identify one or more areas of threat.

Another aspect of the present invention is related to a system for processing meteorological data to automatically characterize significant weather events. The system includes means for receiving meteorological data indicative of a meteorological event affecting a geographic region, means for storing the received meteorological data, and means for processing the meteorological data to create a composite threat field. The means for processing is configured to automatically compare the composite threat field to threshold values to identify one or more areas of threat.

The system and method for providing real-time site specific weather information of the present invention provides a number of advantages over other system and methods currently known in the art. For example, the system and method of the present invention does not rely solely upon less accurate and timely NWS Combined Attribute Table (CAT) data. As a result, the system and method of the present invention is capable of identifying and displaying and/or otherwise distributing severe storm threats and wind shear threats approximately 4 to 5 minutes faster than storm tracking systems which display the National Weather Service Storm Cell Identification and Tracking arrows (SCITs). In addition, the system and method of the present invention is capable of prioritizing severe storm threats and shear threats based upon predetermined criteria and/or user definable criteria. As a result, the severe storm threats and shear threats can be displayed or otherwise distributed sequentially based upon priority ranking. Those in harms way are therefore informed of the most important threats first so that they can react immediately.

An additional advantage of the present invention relates to its use by television weathercasters. Because the system and method of the present invention functions automatically, television weathercasters are not required to manipulate the system during an on-air broadcast. Instead, the system of the present invention automatically processes the received meteorological data, identifies the severe storm threats and/ or shear threats, and displays the threats in graphical image format. Each threat may be displayed to resemble traditional NWS SCITs, but each threat may be displayed independently of the other threats, one after the other, thus enabling the meteorologist to quickly and accurately describe each of the threats to the viewing public. Threat fans may also be automatically created so that, among other things, a list of cities and other points of interest likely to be affected by the storm along with a list of predicted storm arrival times may be automatically generated as is known in the art. All of this is done automatically once the weathercaster initiates the process so that critical time is not wasted by the meteorologist identifying and clicking-on individual portions of the storm to generate the traditional SCITs.

Yet another advantage of the system and method of the present invention relates to its time compositing technology. When several hours of meteorological data has been saved in the system's memory, the system is capable of producing an animation of the graphical images corresponding to the meteorological data. The system analyzes each of the stored images over that period of time and for every frame, displays the maximum value associated with the relevant threat. The system generates a threat time composite path that shows the path or paths of hail, rotation, and/or heavy rain. Using this technology, weathercasters, EMAs, and other emergency personnel may review the displayed historical paths to determine the likely damage path produced by the threat or threats. This technology is extremely valuable, for instance, following a tornado, where phone lines are down and people in need of assistance cannot call for help or otherwise notify authorities where damage to property or persons has actually occurred as a result of the tornado. Now, however, emergency personnel can review the historical data displayed by the system of the present invention to obtain a very accurate indication of where that tornado likely caused damage on the ground.

These and additional features and advantages of the invention will be set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed. The accompanying drawings are included to provide further understanding of the invention, illustrate various embodiments of the invention, and together with the description serve to explain the principles and operation of the invention.

DETAILED DESCRIPTION OF THE PREFERRED EMBODIMENTS

It will be understood by those skilled in the meteorological data processing art that the system and method of processing meteorological data of the present invention has numerous fields of use, and that the processed results may be disseminated to the consuming public or business community in a variety of ways, some of which will be described in the detailed description that follows. For example, site specific weather warnings may be distributed to one or more of a plurality of remote units via a system for distributing real-time site specific weather information such as, but not limited to, the Saf-T-Net™ system manufactured by Baron Services, Inc., Huntsville, Ala., by one or more web sites via a global computer network such as the internet, by radio, by facsimile, and/or by e-mail messages, to name a few. In addition, the processed results may be distributed to television sets via a television broadcast. Moreover, the results may be distributed by any number of communication mediums, such as, but not limited to, a land line telephone network, wireless telephone network, television cable network, a television broadcast network, or via radio broadcast. Accordingly, the following detailed description of the preferred embodiments of the invention are not to be taken in a limiting sense, but are made merely for the purpose of describing the general principles and operation of the invention as it is claimed. Unless otherwise expressly indicated in the text, a preferred embodiment of the system and method of processing meteorological data to automatically characterize significant meteorological events shall now be described as implemented by a television weathercaster.

Reference will now be made in detail to the present preferred embodiments of the invention, examples of which are illustrated in the accompanying drawing figures. Wherever possible like reference characters will represent like parts throughout the several views. An exemplary embodiment of the system for processing meteorological data to automatically characterize significant weather events of the present invention is shown schematically in FIG. 1, and is designated generally throughout by reference numeral 20.

Figure 1:
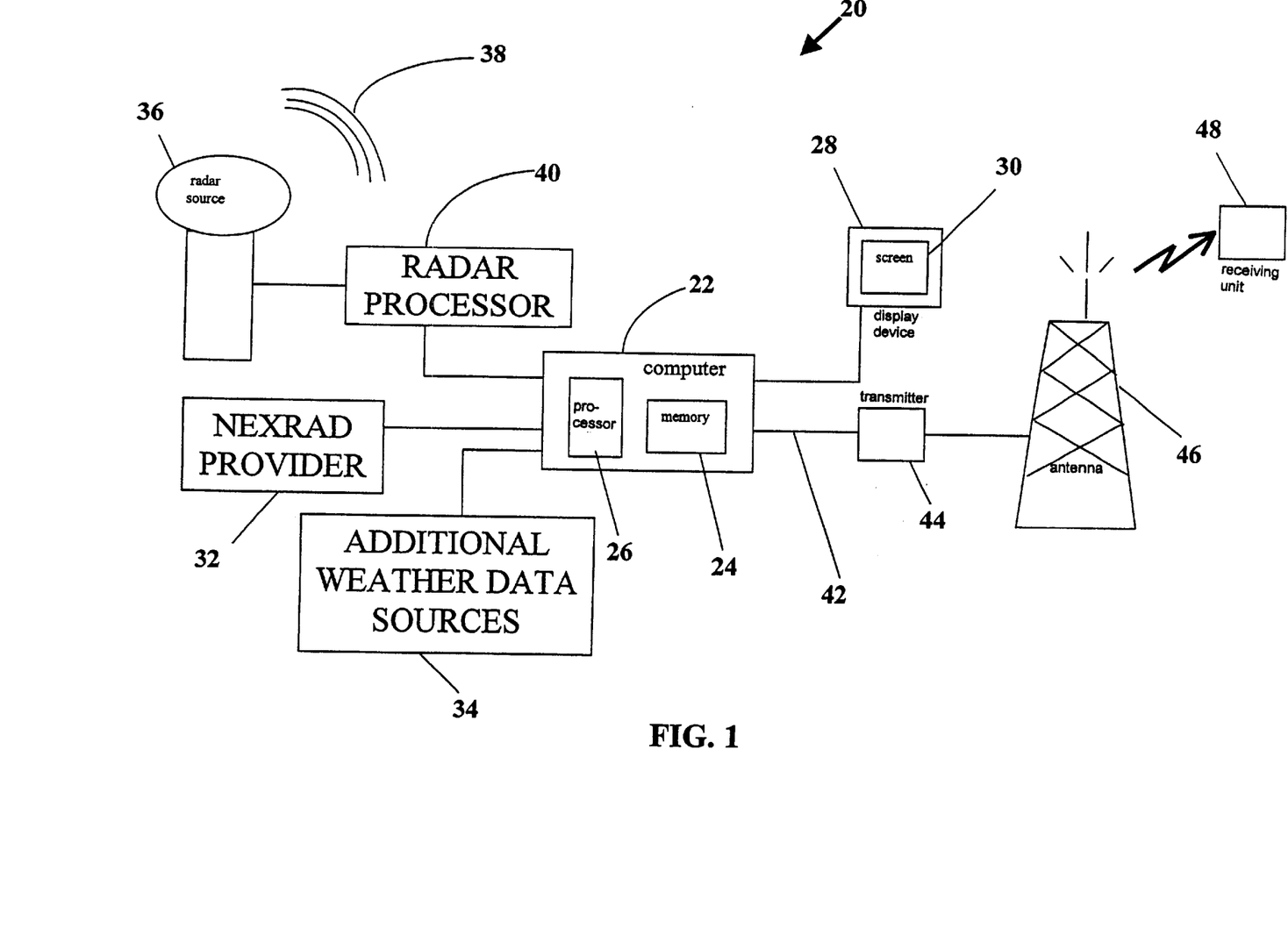
FIG. 1 is a schematic diagram illustrating a weather reporting and forecasting system incorporating a preferred embodiment of the system of the present invention.

As schematically illustrated in FIG. 1, preferred weather processing system 20 preferably includes a computer 22 having a memory 24 and a processor 26. Generally speaking, computer 22 will be located in the weather center of a local television station and may include a display device 28 having a display screen 30 for graphically displaying meteorological data processed by processor 26. Generally speaking, computer 22 communicates with one or more sources of meteorological data such as, but not limited to, a source of Nexrad data 32, a source of other meteorological data 34 such as lightning data, and if available, a real-time local Doppler radar source 36. Generally speaking, the real-time Doppler radar source 36 will be owned by or under lease by the television station where the computer 22 resides. In such cases, radar return signals 38 will be received by radar 36 and thereafter processed by radar processor 40 prior to being delivered to computer 22.

The primary advantages of the present invention are derived from the processing that occurs at computer 22. Computer 22 is programmed with instruction for processing meteorological data received from one or more of the meteorological data sources 32, 34, and/or 36. The software instructs the processor 26 with respect to the way in which the received meteorological data is to be organized, manipulated, and thereafter combined so that it can be analyzed and processed using mathematical algorithms that will be described in greater detail below. Processor 26 is preferably instructed to derive three (3) types of threat information when processing the received meteorological data. The three types of threat information are then combined to produce a composite threat field which is queried by computer 22 and compared to one or more threshold values that are either preprogrammed or user definable. Those portions of the composite threat field meeting and/or exceeding one or more of the threshold values are automatically identified as an area of threat and are immediately available for graphic display, for automated alert notification, or can be disseminated through various other mechanisms. For the television broadcast industry, the output of the above-described processing is automatically distributed from computer 22 along a communication path 42 to a transmitter 44 where it is broadcast via antenna 46 to remote receiving units 48 such as television sets where it may be graphically displayed.

Figure 2:
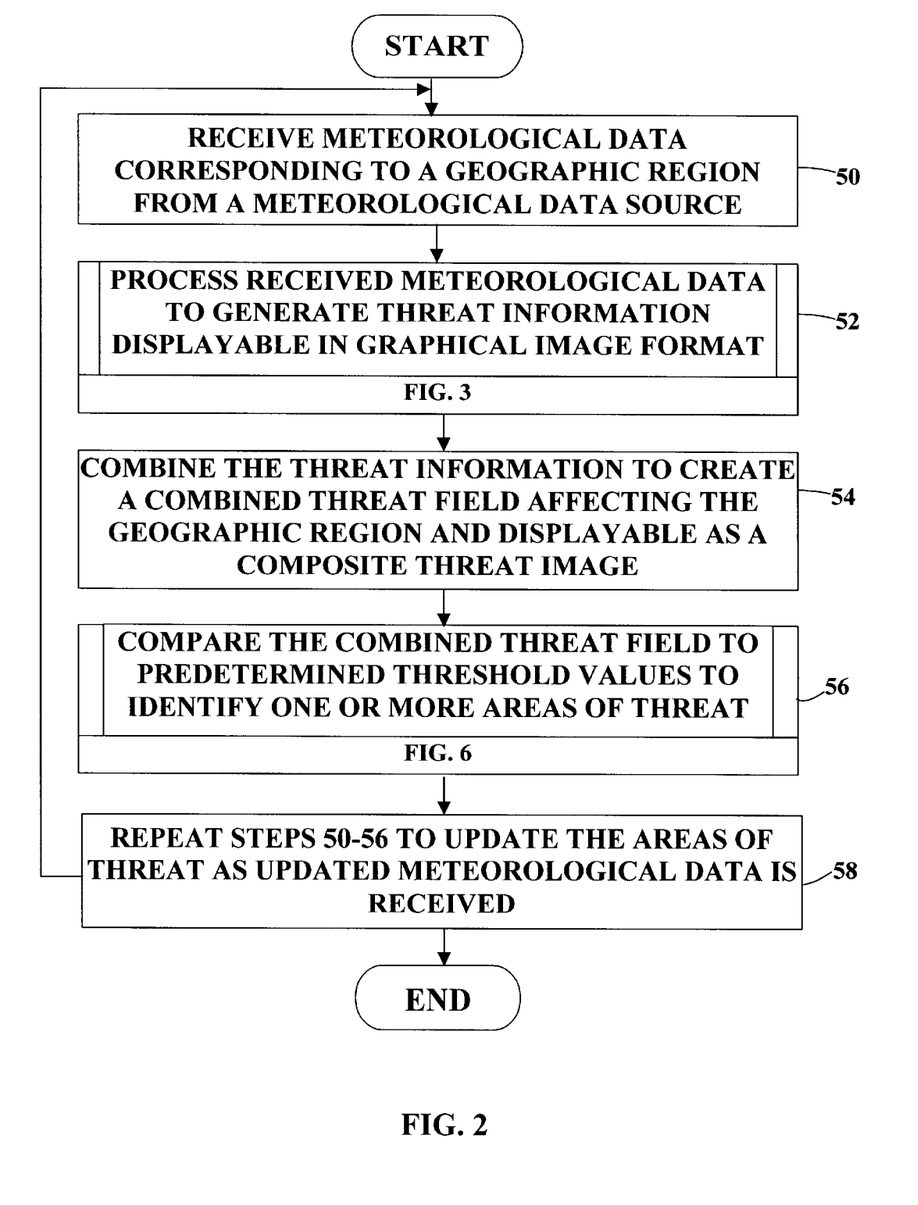
FIG. 2 is a flow chart illustrating a preferred method of processing meteorological data in accordance with the present invention.

In operation, and with reference to FIG. 2, computer 22 receives meteorological data corresponding to a geographic region from at least one meteorological data source, as indicated by block 50. This data may be real-time Doppler radar data received by a locally owned or leased radar 36, Nexrad radar data distributed by the NWS via a source of Nexrad data 32, another source of meteorological data 34, or some combination thereof. Generally speaking, the received meteorological data defines a detectable volume of a weather event affecting the geographic area of interest. Moreover, the received meteorological data is preferably stored in computer 22 memory 24 so that it may be used with any number of storm tracking systems for historical review of the weather event as will be discussed in greater detail below.

Figure 3:
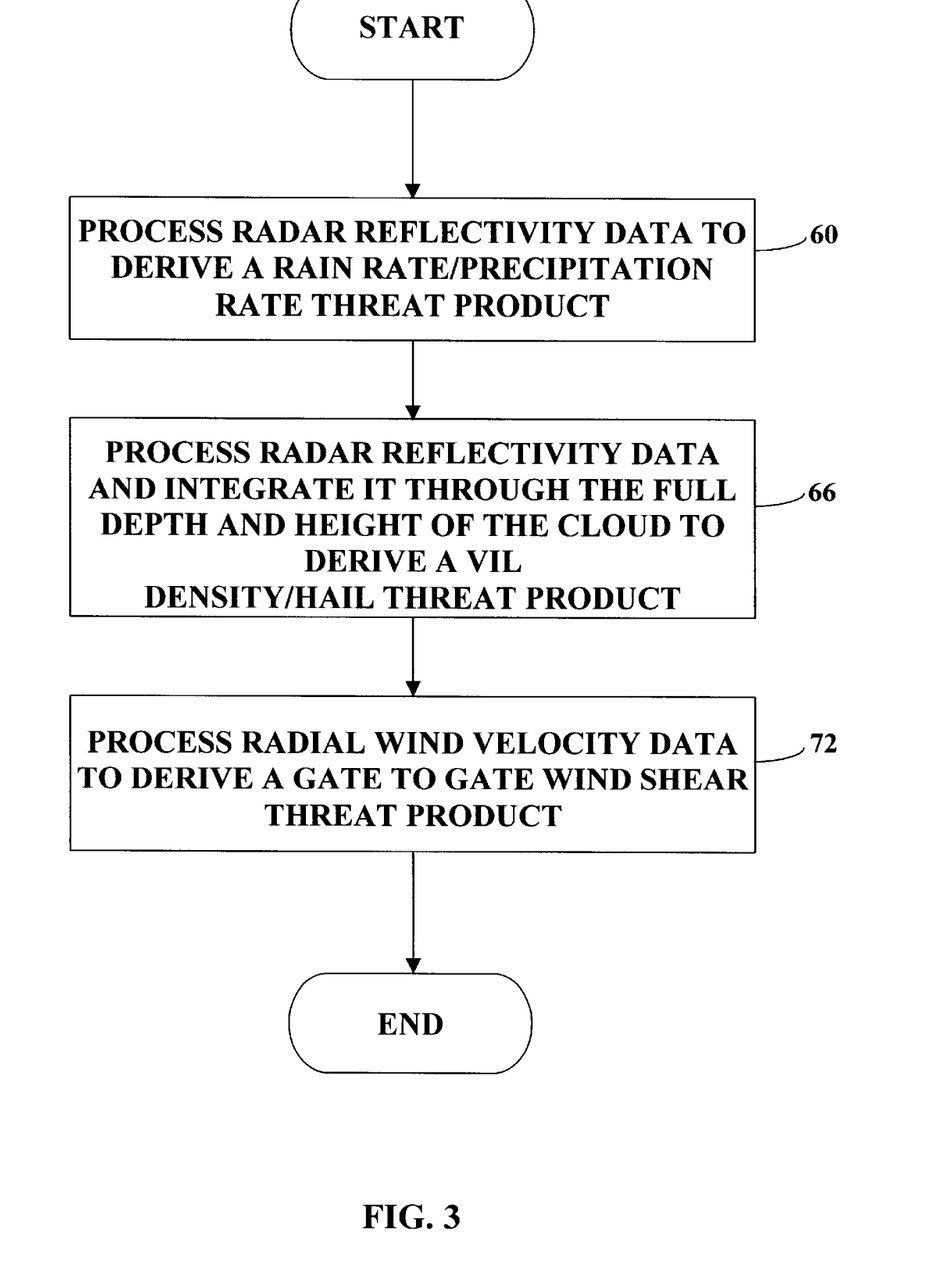
FIG. 3 is a flow chart illustrating a preferred method of processing meteorological data to generate threat information as indicated at block 52 of FIG. 2.
Figure 4:
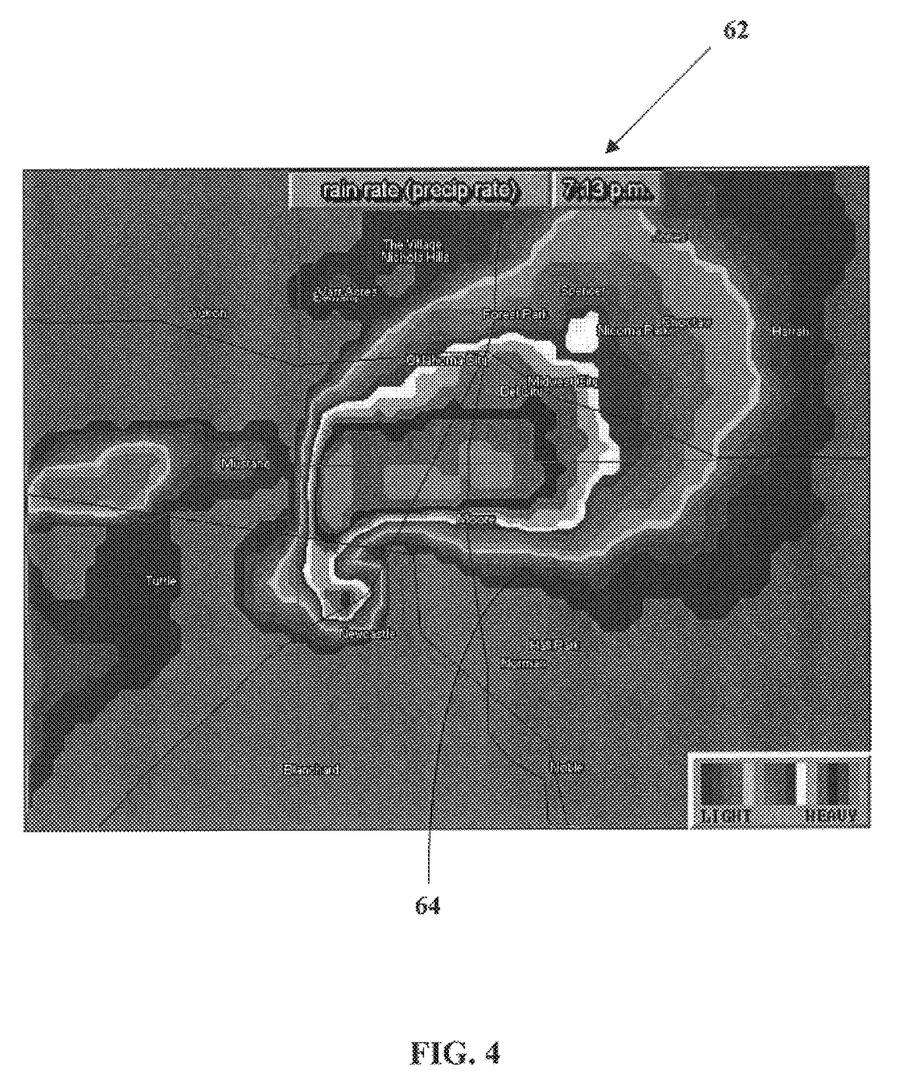
FIG. 4 is the rain rate/precipitation rate screen grab depicting a graphical image of an exemplary rain rate/precipitation rate threat product in accordance with the present invention.
Figure 5:
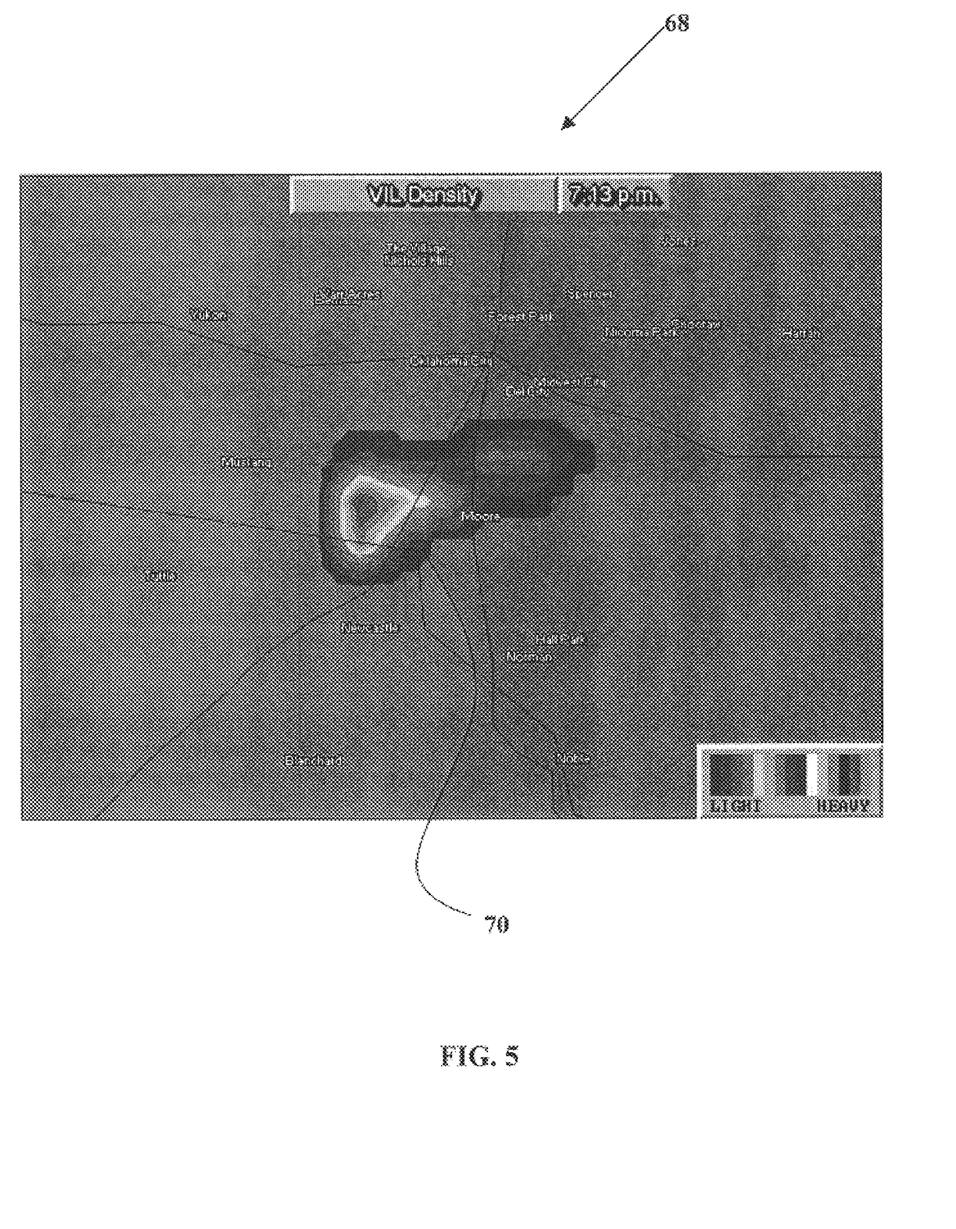
FIG. 5 is a VIL Density screen grab illustrating an exemplary graphical image of a VIL Density/Hail threat product.

As indicated at block 52, received meteorological data is processed to generate threat information that is displayable in graphical image format, as further described with reference to FIG. 3. The threat information is then combined to create a combined threat field affecting the geographic region and is displayable as a composite image as depicted at block 54. The combined threat field may then be compared to predetermined threshold values to identify one or more areas of threat as indicated at block 56 and as further described with reference to FIG. 6. As indicated at block 58, steps 50–56 may be repeated to update the areas of threat as updated meteorological data is received. The operation described in block 52 (FIG. 2) will now be described in greater detail with reference to FIG. 3. In a preferred embodiment of the present invention, the received meteorological data includes both radar reflectivity data and radial wind velocity data. This data is preferably provided for each level or slice of the atmosphere ranging from radar tilt level 1 (that closest to the earth's surface) through the radar's echo top (the highest radar tilt level). The threat information displayable in graphical image format is preferably generated by processing the radar reflectivity data to derive a radar rain rate/precipitation threat product as indicated at block 60, the generation of which is conventionally known in the art. A radar rain rate/precipitation rate screen grab 62 depicting an exemplary rain rate/precipitation rate threat product 64 is depicted in FIG. 4. As indicated at block 66, the radar reflectivity data is also preferably processed to derive a VIL density/hail threat product such as that shown in the VIL Density screen grab 68 of FIG. 5. An exemplary VIL Density/hail threat product 70 is shown centrally positioned within VIL Density screen grab 68 as is commonly known in the art. Generally speaking, to derive VIL Density, the radar reflectivity data is integrated through the full depth of the cloud or storm knowing the height of the cloud, or what is known in the art as the cloud's echo top, where the Vertical Integrated Liquid (VIL) is the radar-estimated integrated liquid water in the cloud, and the density is the concentration of that liquid water per cubic volume. Thus, the VIL density/hail threat product is derived by taking the vertically integrated liquid (VIL) in the cloud and dividing that value by the radar-estimated height of the cloud. Generally speaking, a relatively high VIL Density value is highly correlated with severe weather through hail, hail size, strong surface winds, and lightning. As indicated at block 72, radial wind velocity data received from the meteorological data source is also processed to derive a gate-to-gate wind shear threat product. Although an exemplary wind shear threat product is not depicted in the drawing figures, the system and method for deriving gate-to-gate wind shear is fully disclosed in U.S. Pat. No. 6,163,756, issued Dec. 19, 2000 to Baron Services, Inc., and entitled, "System and Method for Detecting and Displaying Wind Shear," which is hereby incorporated by reference herein. Like the other threat products, the gate-to-gate wind shear product derived in accordance with the disclosure set forth in U.S. Pat. No. 6,163,756, maybe graphically displayed in either two dimensional or three dimensional format and overlaid or otherwise associated with the geographic area that it is affecting. Although the processing steps described above have been shown and described in a particular order, it will be appreciated by those skilled in the art that the processing steps necessary to derive the rain rate/precipitation rate threat product, the VIL density/hail threat product, and the wind shear threat product may be performed in any sequence without departing from the spirit and scope of the present invention.

Referring again to FIG. 2, once the radar reflectivity data and radial wind velocity data are processed to derive the above-mentioned threat products, the threat products are combined to create a combined or composite threat field that represents the primary meteorological threats affecting the geographic region of interest. Like the individual threat products described above, the combined threat field is displayable as a composite threat image. Using a conventional storm tracking system such as Fastrac Millenium™ or VIPIR®, both of which are manufactured by Baron Services, Inc., Huntsville, Ala., composite imagery may be generated using a combination of heavy convective rain rates, VIL density for hail location and size, and maximum low-level cyclonic shear. The data corresponding to this composite threat image that is resident in computer 22 is then preferably compared to predetermined threshold values to identify one or more areas of threat as indicated at block 56. The preferred process for performing the comparing step will now be described in greater detail with reference to FIG. 6.

With the data (combined threat field) corresponding to the composite threat image created, a set of algorithms may then be used to process the data to locate that data indicative of at least two types of significant weather. The first type is that associated with hail, lightning and severe rain fall at or near the ground, and the second type is that associated with any of these conditions but that also includes rotation that may lead to strong damaging winds, such as a tornado, at or near the earth's surface. In a preferred embodiment, the processor first analyzes the combined threat field to identify severe storms without rotation in a first pass through the data, and then makes a second pass through the data to determine if any of those areas include rotation or shear that would constitute an additional threat. In some instances, the processor will locate areas having rotation or shear that do not also include heavy rain or hail. As a result of this processing, two types of threat attributes are identified, the severe storm threat for hail and heavy rain, and the shear threat for areas exhibiting hail and heavy rain but also including rotation. As mentioned above, the shear threat may also include areas exhibiting rotation without also exhibiting hail and heavy rain. Also of relevance are the physical size of those events and their direction and speed.

Generally speaking, the two types of threat attributes may exist separately from each other in a cloud or they may exist together. Accordingly, it is possible to have one or the other, or both in a given cloud at any given time. In addition, the shear threats and severe storm threats may exist concurrently, but be located in different portions of the storm at the same time. Once these severe storm threats and shear threats have been identified, the system may prioritize the various threats based on predefined criteria or, if desired, based upon user definable criteria, and alert for the threats either concurrently, or sequentially based upon priority.

Figure 6:
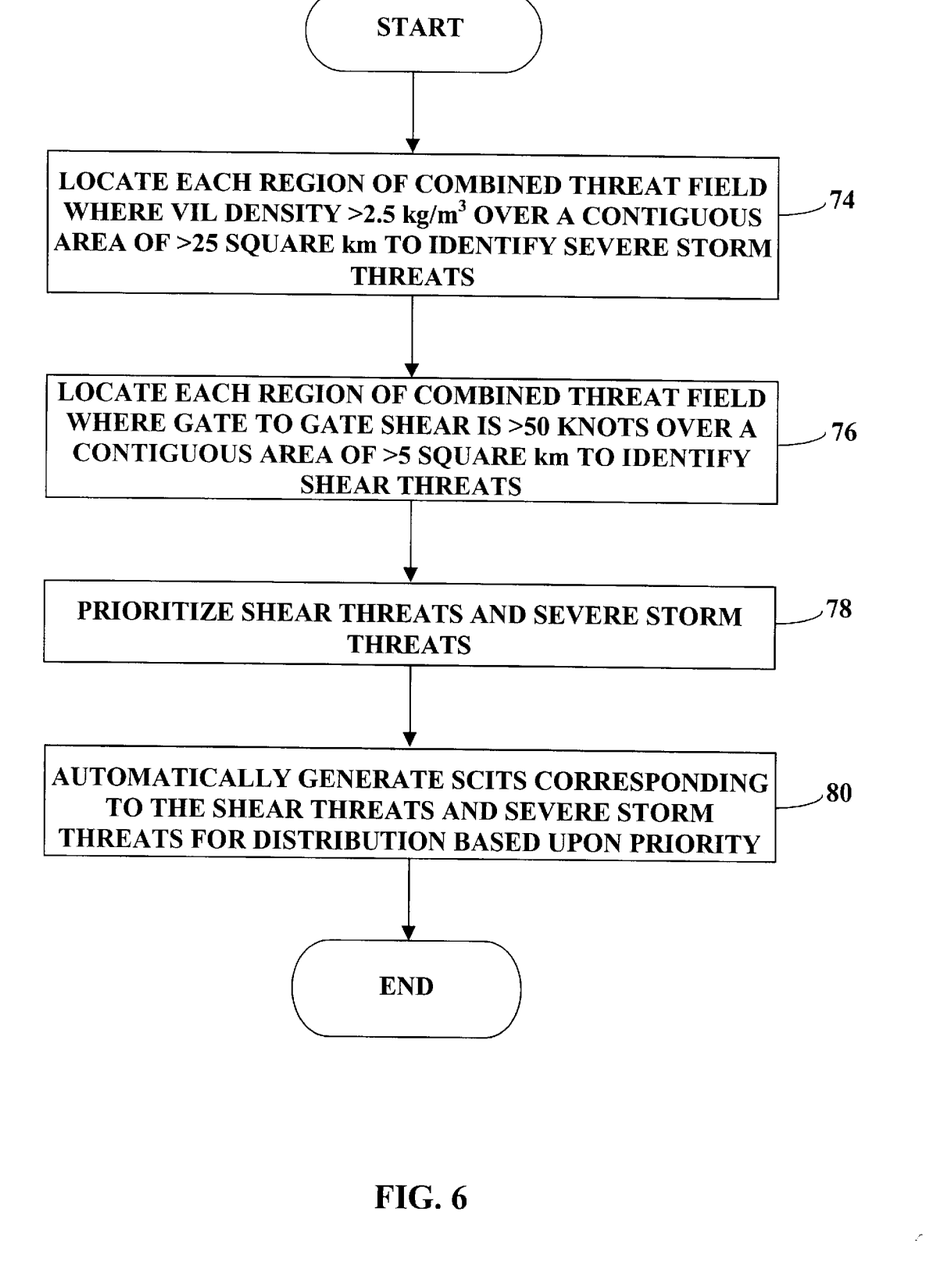
FIG. 6 is a flow chart illustrating an exemplary method of identifying one or more areas of threat in accordance with block 56 of FIG. 2.

The flow chart depicted in FIG. 6 illustrates a preferred method of prioritizing the areas of threat in accordance with the present invention. As illustrated at block 74, processor 26 analyzes the combined threat field to locate each region of the combined threat field where VIL density is at least greater than 1.5 kg/m$^3$ over a contiguous geographic area of greater than 15 sq. km and preferably greater than 2.5 kg/m$^3$ over a contiguous geographic area of greater than 25 sq. km to identify the severe storm threats as indicated at block 74. In addition, processor 26 analyzes the combined threat field to locate each region of the combined threat field where gate-to-gate wind shear at least exceeds 35 knots over a contiguous area of more than 3 sq. km and preferably is in excess of 50 knots over a contiguous area of more than 5 sq. km to identify the shear threats as indicated at block 76. As indicated at block 78, the shear threats and severe storm threats may then be prioritized based upon several factors, such as the size, intensity, and speed of the identified threats. As indicated at block 80 the system of the present invention preferably automatically generates Storm Cell Identification and Tracking (SCIT) arrows corresponding to the shear threats and severe storm threats for alert distribution based upon priority.

Figure 7:
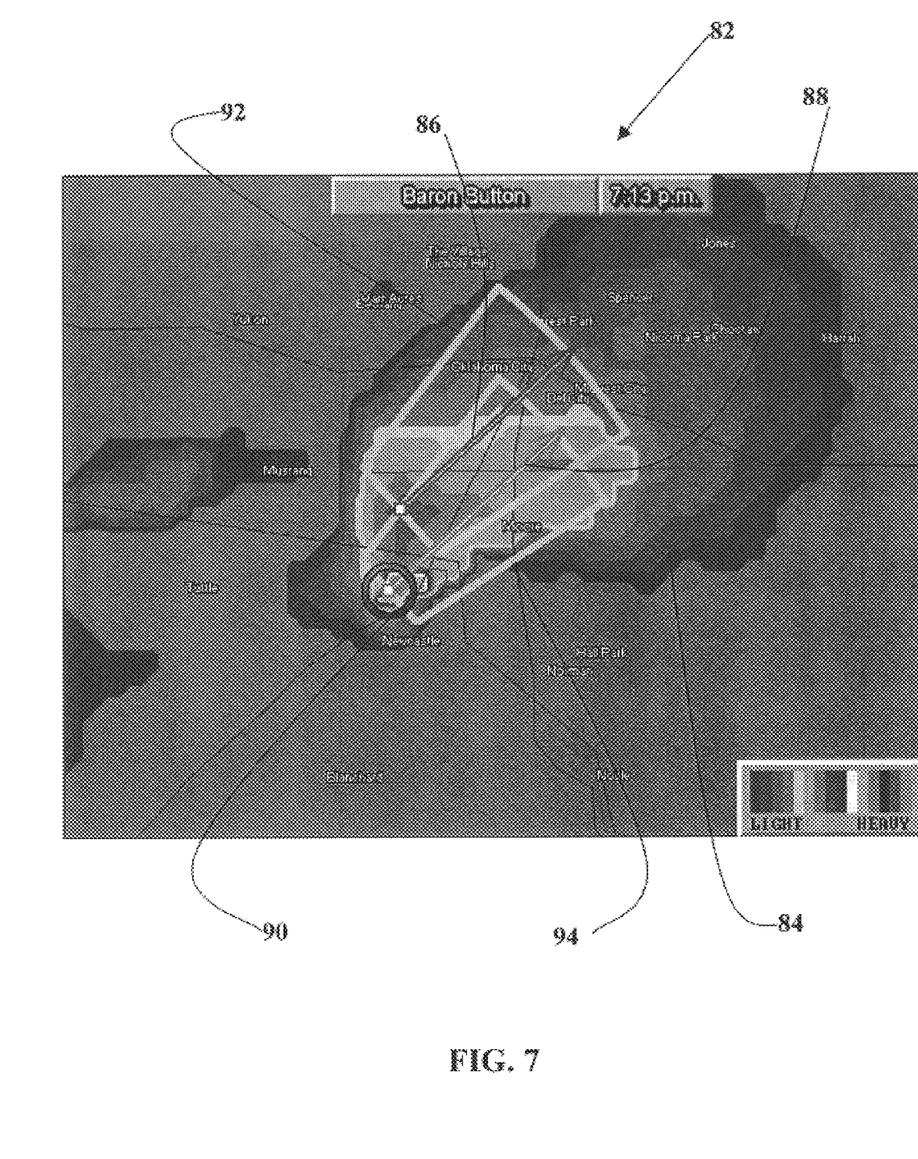
FIG. 7 is a composite screen grab illustrating an exemplary composite threat image in accordance with the present invention. The depicted composite threat image is a combination of the graphical representation of the rain rate threat product depicted in FIG. 4, the graphical representation of the VIL Density threat product depicted in FIG. 5, and a graphical representation of the shear threat product (not shown individually in a separate drawing figure).

As illustrated in the composite screen grab 82 depicted in FIG. 7, a composite threat image 84 corresponding to the composite threat field may be graphically displayed on an optional display device 28 and/or at a remote receiving unit 48 such as a television set via television broadcast. In accordance with the preferred embodiment of the present invention, a severe storm SCIT 86 corresponding to the severe storm threat and a shear SCIT 88 corresponding to the shear threat have been automatically created and displayed on composite threat image 84 to indicate the location of the respective threats as well as their projected directions and speeds of travel. A shear marker 90 has also been automatically created and displayed to indicate the present location where gate-to-gate cyclonic shear exceeds 50 knots over a contiguous area of more than 5 square kilometers to denote the area of sustained potentially dangerous rotation close to the earth's surface. In accordance with the invention, a severe storm fan 92 and a shear fan 94 have also been automatically created and displayed to indicate the area of coverage of the severe storm threat and shear threat, respectively.

Although both the severe storm SCIT 86 and the shear SCIT 88 and their associated fans 92 and 94, respectively, are shown concurrently displayed, each may be displayed sequentially based upon priority ranking. Generally speaking, shear SCIT 88, indicative of the most severe threat would be displayed first, while severe storm SCIT 86 would be displayed second.

Although not shown in the drawing figures, automatic storm alerts may also be distributed to remote units via any type of network in accordance with another aspect of the present invention. As disclosed in U.S. Pat. No. 6,018,699, issued Jan. 25, 2000 to Baron Services, Inc., Huntsville, Ala., and entitled, "System and Methods for Distributing Real-Time Site Specific Weather Information," which is hereby incorporated by reference herein, remote units falling within the boundaries of fans 92 and 94 will automatically receive an alert notification identifying the type of threat, and preferably its severity. A further aspect of the invention not shown in the drawing figures is the visual display of the threats via the internet.

Like other storm tracking systems, the present invention also provides for the identification of cities, and other populated areas likely to be affected by the threat(s), as well as a list of predicted times in which the threat(s) will arrive at each of the cities affected.

Figure 8:
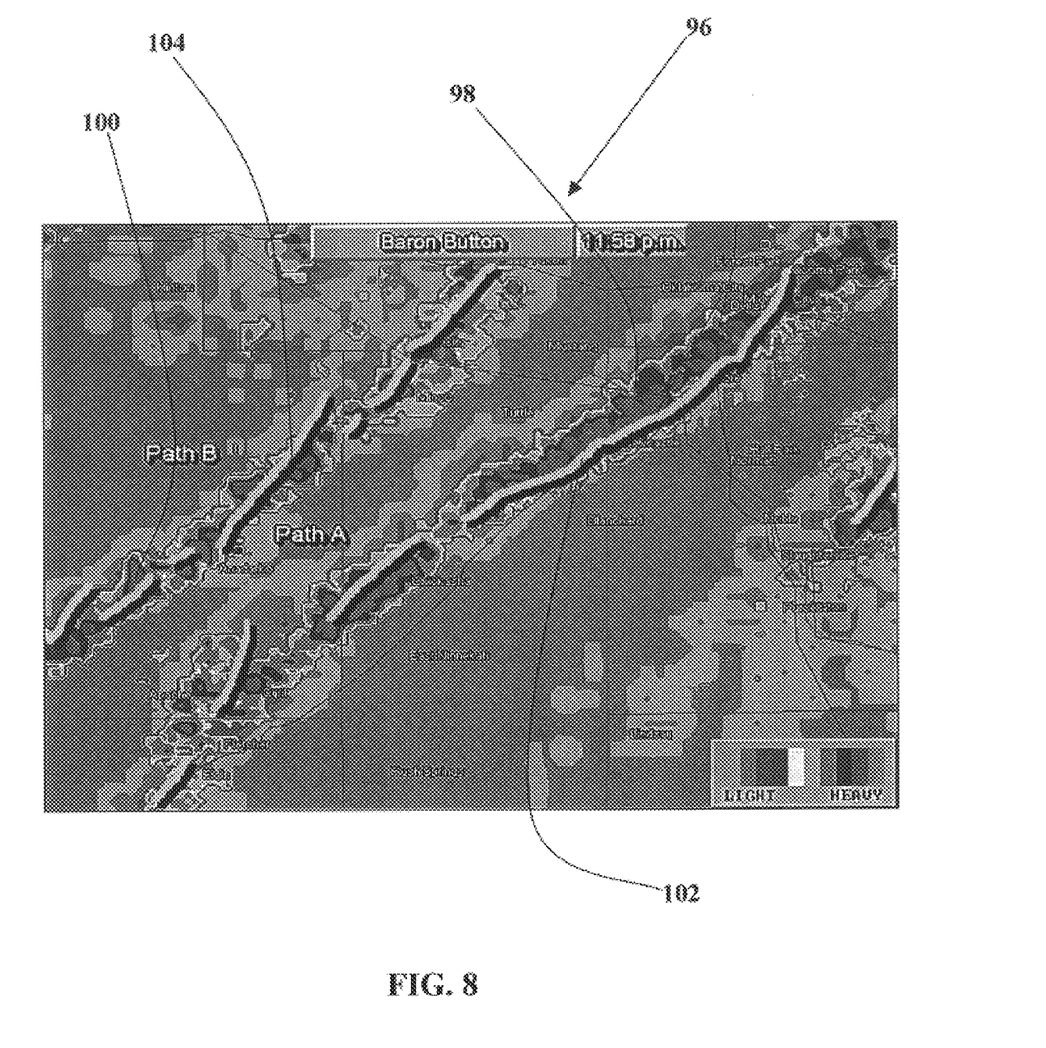
FIG. 8 is a time composited graphical representation of the combined threat field data showing the projected shear paths and hail paths time composited from historical threat field data. Actual observed tornado damage paths "A" and "B" have been superimposed over the graphical display.

As illustrated in FIG. 8 the system and method of the present invention also provides for historical time compositing of the combined threat field data for graphical display. The historical meteorological data used to generate the graphics depicted in FIG. 8 was taken from WSR-88D data originating from four NWS weather radars (FDR, TLX, VNX and INX) over a time period of eight (8) hours (from 2 pm to 10 pm local time) on May 3, 1999. The time composited screen grab 96 of graphical imagery of meteorological data shown affecting central and eastern Oklahoma (southwest of Oklahoma City) during that time period was processed in accordance with a preferred embodiment of the system of the present invention. Here, the historical time composited imagery was produced by integrating individual volume scan images, but only plotting the most intense values (highest count values at each pixel location) from all radars during the above mentioned time period. The threat imagery depicted in FIG. 8 and derived in accordance with a preferred method of the present invention includes the maximum low-level (tilts 1 and 2) cyclonic shear threat product (using both storm relative and mean velocities) depicting areas greater than 50-knot gate-to-gate shear. This product quickly displays regions of potentially dangerous low-level rotation as viewed from multiple radars. The threat imagery also includes a multi-radar VIL density threat product where VIL density is greater than 3.0 kg/m$^3$ showing probable hail areas, and a rainfall/precipitation rate threat product indicating heavy convective rainfall rates. The above mentioned threat products were combined to create the composite threat imagery in accordance with the method of the present invention and only the most severe threat was used at a single pixel location.

As a result of the processing in accordance with the method of the present invention, a time composited graphical representation of a first shear/hail threat path 98 and a second shear/hail threat path 100 are depicted in FIG. 8. The known actual tornado paths affecting the portion of Oklahoma depicted in FIG. 8 have been superimposed over the threat paths and are identified as tornado path A 102 and tornado path B 104. The superimposed paths demonstrate, among other things, the accuracy of the system of method of the present invention, and the usefulness of the historical time compositing functionality of the present invention for, among other things, damage assessment. Although the only radar data used in the example depicted in FIG. 8 was derived from NIDS distributed WSR-88D products, other radar data and meteorological data from other sources can be used with the invention to provide the same or substantially similar functionality.

It will be apparent to those skilled in the art that various modifications and variations can be made to the present invention without departing from the spirit and scope of the invention. For example, the system and method of the present invention also provides for Automatic Warning Detection and Display (AWDD). AWDD uses NWS warning data to automatically highlight counties under a severe storm or tornado warning. These and other NWS warnings may be automatically posted directly to the mapping displays as soon as they are issued. In accordance with a preferred embodiment of this aspect of the present invention, processor 26 assigns user-defined color codes to the counties affected by the warning, and those counties affected are shown in that color on the display screen at the same time composite threat imagery, shear SCITS, severe storm SCITS and other graphical imagery are displayed. As a result, viewers may now quickly discern whether the NWS warning is likely to affect their particular location within the county under warning. Thus it is intended that the present invention cover the modifications and variations of this invention provided they come within the scope of the appended claims and their equivalents.

What is claimed is:

1. A computer based method of processing weather data to automatically characterize significant weather events, the method comprising the steps of:

receiving weather data for a geographic area, the weather data comprising radar reflectivity data and radial wind velocity data;

processing the radar reflectivity data to derive a radar rain rate threat image for the geographic area;

processing the radar reflectivity data to derive a VIL Density threat image for the geographic area;

combining the radar rain rate threat image, and the VIL Density threat image for the geographic area to create a composite threat image for the geographic area; and comparing the cc site threat image to predetermined threshold values to identify one or more areas of threat.

2. The method of claim 1 further comprising:

processing the radial wind velocity data to derive a gate-to-gate wind shear threat image for the geographic area; and combining the radar rain rate threat image, VIL Density threat image, and gate-to-gate wind shear threat gas for the geographic area to create the composite threat image for the geographic area.

3. The method of claim 2 wherein the comparing step comprises the steps of:

locating each region of the composite threat image where VIL density exceeds 1.5 kg/m$^3$ over a contiguous area of greater than 15 sq. km; and locating each region of the composite threat image where gate-to-gate wind shear exceeds 35 knots a contiguous area greater than 3 sq. km.

4. The method of claim 1 further comprising the step of automatically generating SCITS corresponding to the one or more identified areas of threat.

5. A computer based method of processing meteorological data to automatically characterize significant weather events, the method comprising the steps of:

creating a composite threat field from meteorological data received from a meteorological data source, the composite threat field represents primary meteorological threats affecting a geographic region of interest, the composite threat field displayable as a composite threat image comprising:

a radar rain rate threat information displayable in graphical image format;

a VIL density threat information displayable in graphical image format; and a gate-to-gate wind shear threat information displayable in graphical image format; and comparing the composite threat image to predetermined threshold values to identify one or more areas of threat.

6. The computer based method of claim 5 further comprising the step of automatically generating SCITS corresponding to the one or more identified areas of threat.

7. The method of claim 6 further comprising the step of automatically prioritizing the automatically generated SCITS.

8. The method of claim 7 further comprising the step of sequentially displaying the SCITS on a display device based upon priority.

9. A method of processing meteorological data to automatically characterize significant weather events, the method comprising the steps of:

receiving meteorological data indicative of a meteorological event affecting a geographic region;

processing the meteorological data to generate a first threat image affecting the geographic region;

processing the meteorological data to generate a second threat image affecting the geographic region, the first threat image being distinct from the second threat image;

combining the first and second threat images to create a composite threat image affecting the geographic region;

comparing the composite threat image to threshold values to identify one or more areas of threat in the geographic region;

processing the meteorological data to generate a third threat image affecting the geographic region, the third threat image being distinct from the first threat image and the second threat image; and combining the threat image to the first and second threat images to create the composite threat image affecting the geographic region.

10. The method of claim 9 wherein the comparing step comprises the steps of:

locating each region of the composite threat image where VIL density exceeds 1.5 kg/m$^3$ over a contiguous area of greater than 15 sq. km; and locating each region of the composite threat image where gate-to-gate shear exceeds 35 knots over a contiguous area of greater than 3 sq. km.

11. Them method of claim 9 wherein the comparing step comprises the steps of:

locating each region of the composite threat image where VIL density exceeds 2.5 kg/m$^3$ over a contiguous area of greater than 5 sq. km; and locating each region of the composite threat image where gate-to-gate wind shear exceeds 50 knots over a contiguous area of greater than 5 sq. km.

12. The method of claim 9 further comprising the step of automatically generating SCITS corresponding to the one or more identified areas of the threat.

13. The method of claim 12 further comprising the step of automatically prioritizing the generated SCITS.

14. The method of claim 13 further comprising the step of automatically displaying the SCITS sequentially on a display device based upon priority.

* * * * *